(12) United States Patent
Won et al.

(10) Patent No.: US 10,413,763 B2
(45) Date of Patent: Sep. 17, 2019

(54) FIRE EXTINGUISHING FIREFIGHTING DRONE

(71) Applicants: Gi Yeon Won, Ansan-si (KR); Kyung Wha Kim, Daejeon (KR)

(72) Inventors: Gi Yeon Won, Ansan-si (KR); Kyung Wha Kim, Daejeon (KR)

(*) Notice: Subject to any disclaimer, the term of this patent is extended or adjusted under 35 U.S.C. 154(b) by 1 day.

(21) Appl. No.: 15/576,904

(22) PCT Filed: May 26, 2016

(86) PCT No.: PCT/KR2016/005576
§ 371 (c)(1),
(2) Date: Nov. 27, 2017

(87) PCT Pub. No.: WO2016/195320
PCT Pub. Date: Dec. 8, 2016

(65) Prior Publication Data
US 2018/0147429 A1 May 31, 2018

(30) Foreign Application Priority Data
Jun. 1, 2015 (KR) ........................ 10-2015-0077560

(51) Int. Cl.
*A62C 3/02* (2006.01)
*B60F 5/02* (2006.01)
(Continued)

(52) U.S. Cl.
CPC ............ *A62C 3/0242* (2013.01); *A62C 3/025* (2013.01); *A62C 27/00* (2013.01); *B60F 5/02* (2013.01);
(Continued)

(58) Field of Classification Search
CPC ......... A62C 3/0242; A62C 3/00; A62C 3/025; A62C 27/00; A62C 31/02; A62C 31/28;
(Continued)

(56) References Cited

U.S. PATENT DOCUMENTS 1,609,762 A * 12/1926 Morgan ............... A62C 25/005
169/53
3,220,482 A * 11/1965 Eveleth ................ A62C 3/0242
169/53
(Continued)

FOREIGN PATENT DOCUMENTS

JP H11-206903 A 8/1999
KR 10-0979536 B1 9/2010
(Continued)

*Primary Examiner* — Steven J Ganey
(74) *Attorney, Agent, or Firm* — KORUS Patent, LLC; Seong Il Jeong (57) ABSTRACT

The present invention relates to a fire extinguishing firefighting drone which, in case of a fire in a house, a structure, a building, or the like, can be rapidly introduced and extinguish a fire in an early stage of the fire, and can be remotely operated in an unmanned manner through connection with a central control system. The fire extinguishing firefighting drone includes a flight unit configured to include propeller units, a disaster prevention turret unit configured to spray a fire-extinguishing chemical, a plurality of movement units configured to move a body unit, and a disaster prevention means unit configured to be provided with items adapted to spray a fire-extinguishing chemical, to launch a fire-extinguishing bomb, or to save lives.

1 Claim, 14 Drawing Sheets

(51) Int. Cl.
    *B64C 37/00*     (2006.01)
    *B64C 39/02*     (2006.01)
    *A62C 27/00*     (2006.01)
    *B64C 25/40*     (2006.01)
    *B64D 1/02*     (2006.01)
    *B64D 1/18*     (2006.01)
    *A62C 31/02*     (2006.01)
    *A62C 31/28*     (2006.01)
    *A62C 37/40*     (2006.01)

(52) U.S. Cl.
    CPC ............ B64C 25/405 (2013.01); B64C 37/00 (2013.01); B64C 39/02 (2013.01); B64C 39/024 (2013.01); B64D 1/02 (2013.01); B64D 1/18 (2013.01); *A62C 31/02* (2013.01); *A62C 31/28* (2013.01); *A62C 37/40* (2013.01); *B64C 2201/108* (2013.01); *B64C 2201/128* (2013.01); *B64C 2201/162* (2013.01)

(58) Field of Classification Search
    CPC ........... A62C 37/40; A62C 99/00; B60F 5/02; B64C 25/405; B64C 37/00; B64C 39/02; B64C 39/024; B64D 1/02; B64D 1/18
    USPC ........ 169/24, 25, 36, 53; 239/159, 160, 164, 239/171, 172; 244/12.4, 17.11, 17.23, 244/136

See application file for complete search history.

(56) References Cited

U.S. PATENT DOCUMENTS

| | | | |
|---|---|---|---|
| 3,759,330 A | * | 9/1973 | Rainey ................ A62C 3/0242 |
| | | | 169/53 |
| 8,453,962 B2 | | 6/2013 | Shaw |
| 9,290,267 B2 | * | 3/2016 | Metreveli ............... B64C 27/20 |
| 2013/0134254 A1 | * | 5/2013 | Moore .................... B64D 1/16 |
| | | | 244/17.11 |

FOREIGN PATENT DOCUMENTS

| | | |
|---|---|---|
| KR | 10-1304529 B1 | 9/2013 |
| KR | 10-1437323 B1 | 9/2014 |
| KR | 10-2015-0021293 A | 3/2015 |

\* cited by examiner

FIRE EXTINGUISHING FIREFIGHTING DRONE

TECHNICAL FIELD

The present invention relates to a fire extinguishing firefighting drone, and more specifically to a fire extinguishing firefighting drone which, in case of a fire in a house, a structure, a building, or the like, can be rapidly introduced in an early stage and extinguish a fire, can freely perform ground movement and flight movement, and can be remotely operated in an unmanned manner through connection with a central control system.

BACKGROUND ART

Generally, firefighting helicopters are aircrafts which fly their bodies by means of lift force and propulsion force which are generated by flows of air passing over the surfaces of rotor blades when rotating the rotor blades by means of engines. Firefighting helicopters are being used for various purposes, such as transportation and movement, attacks, firefighting, etc.

In particular, firefighting helicopters are effectively used to extinguish fires at sites to which fire engines cannot move or fire hoses cannot be introduced, such as a forest fire, etc.

However, such firefighting helicopters have a disadvantage in that they can extinguish fires only outside houses or buildings, and have a problem in which they cannot substantially extinguish fires which break out inside buildings.

Recently, in order to perform rapid fire extinguishment, various firefighting robots and firefighting helicopters have been used at fire sites so as to approach staring locations of frames. In particular, with the development of unmanned aircraft technology, there is a tendency for unmanned aircrafts capable of performing assigned missions, i.e., an attack, reconnaissance, information relay, surveillance, etc, without pilots to be developed for the purpose of fire extinguishment and firefighting.

However, such unmanned aircrafts have a problem in that they cannot extinguish fires which break out inside buildings in their early stages.

PRIOR ART DOCUMENT (Patent document 1) Korean Patent No. 10-1304529 (registered on Aug. 30, 2013)

DISCLOSURE

Technical Problem

The present invention is intended to overcome the above-described problems, and an object of the present invention is to provide a fire extinguishing firefighting drone which is configured to, in order to rapidly deal with a fire in a building in its early stage, be introduced into the building and directly extinguish the fire by means of a nozzle and a fire-extinguishing bomb.

An object of the present invention is to provide a fire extinguishing firefighting drone which can determine the number of rescue target persons remaining in a building in case of a fire in the building and can also provide lifesaving items, such as gas masks, respirators, etc. in case of risk to lives based on a rescue state.

An object of the present invention is to provide a fire extinguishing firefighting drone which can be freely introduced into a high-rise building and can also freely perform ground movement and flight movement within the inner narrow space of a building without a clear view, thereby rapidly performing early fire extinguishment.

An object of the present invention is to provide a fire extinguishing firefighting drone which can detect or deal with the status of a fire by means of a camera and can also spray a fire-extinguishing chemical by means of the nozzle of the fire extinguishing drone while flying through a vertical angle of 180 degrees or rotating through 360 degrees or use a disaster prevention fire-extinguishing bomb.

An object of the present invention is to provide a fire extinguishing firefighting drone which uses a plurality of wheels integrated with a battery or an individual servomotor as a driving means for the fire extinguishing drone, thereby preventing explosion attributable to a fire, enabling stable and secure movement through sliding movement between an uneven road surface and the wheels, generating strong driving force in a small space, and enabling hybrid-type fire extinguishment based on free ground and flight movement.

An object of the present invention is to provide a fire extinguishing firefighting drone which enables wheels to be individually controlled upon ground movement of the fire extinguishing drone and, thus, can perform and also desirably perform ground movement even when any one of the wheels has broken due to damage or the like.

An object of the present invention is to provide a fire extinguishing firefighting drone which can immediately take measures according to the status, state and development of fire and is equipped with various functions, thereby enabling various types of fire to be extinguished and also enabling lifesaving to be accomplished.

Technical Solution

In order to accomplish the above objects, the present invention provides a fire extinguishing firefighting drone which is flown and controlled in an unmanned manner, the drone including: a body unit (102) configured to include an upper body (10) and side bodies (12) which have a "⋂" shape; a flight unit (104) configured to be installed on the body unit (102), and to have propeller units (105) so as to enable flight; a disaster prevention turret unit (106) configured to be installed on the flight unit (104), and to detect the status of a fire and spray a fire-extinguishing chemical; a plurality of movement units (108) configured to be installed beneath the body unit (102), and to move the body unit (102); and a disaster prevention means unit (110) configured to be provided with items adapted to spray a fire-extinguishing chemical, to launch a fire-extinguishing bomb, or to save lives depending on the status of the fire; wherein the body unit (102) includes: a battery accommodation part (16) configured to supply power to a lower portion of the upper body (10); and a lower body (30) configured such that a CPU accommodation part (20) is formed beneath the battery accommodation part (16), brackets (14) are installed on both sides of the side body (12), and fasteners (32) are provided beneath the CPU accommodation part (20); and a flight control unit (112) is included in the CPU accommodation part (20).

Advantageous Effects

The fire extinguishing firefighting drone according to an embodiment of the present invention has an effect of enabling initial countermeasure extinguishment to be performed within a few minutes in case of fire, and also has an effect of preventing the damager of a second fire by rapidly extinguishing a fire.

The present invention has an effect of, in order to immediately deal with various types of fire sites, introducing the composite fire extinguishing drone having various purposes, detecting the states of lifesaving, initial fire extinguishment, and a fire within a building, performing efficient selection for a composite fire situation, and then rapidly taking countermeasures.

The present invention has an effect of approaching a fire outside a building through flight movement, rapidly moving along an uneven floor inside the building by using the wheels configured to be operated by the separate servo-motors, and then extinguishing the fire in its early stage.

MODE FOR INVENTION

Figure 1:
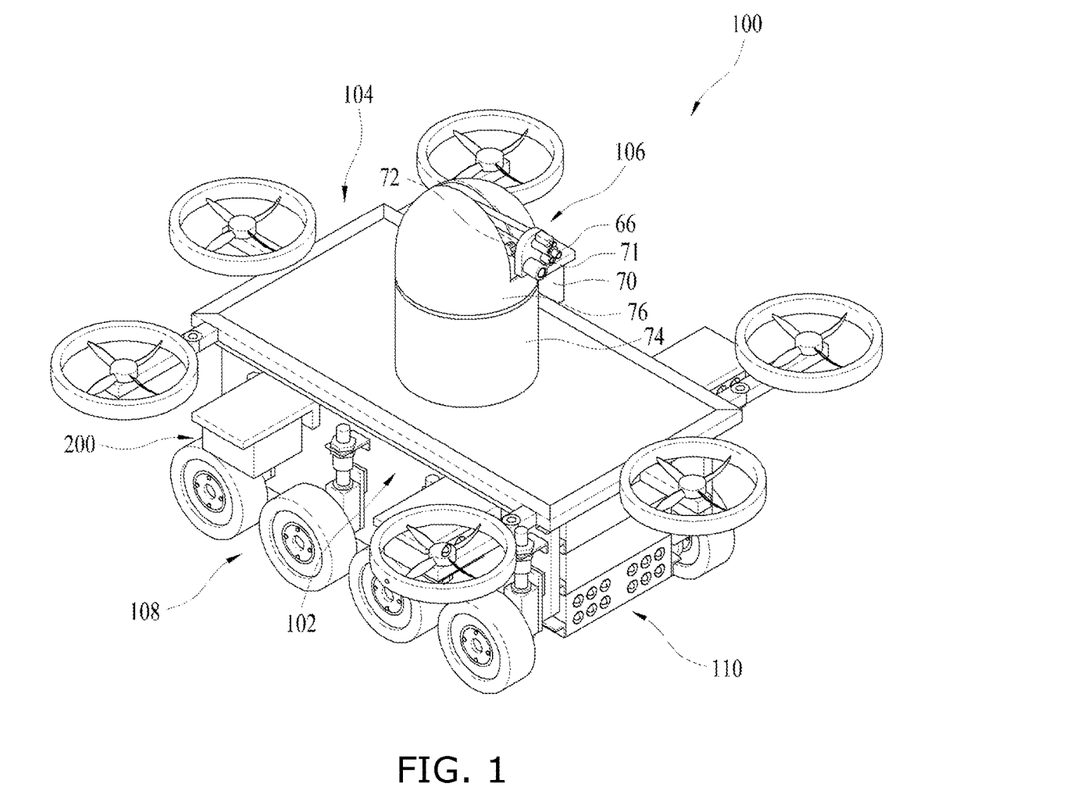
FIG. 1 is a perspective view showing the structure of a fire extinguishing firefighting drone according to the present invention.
Figure 2:
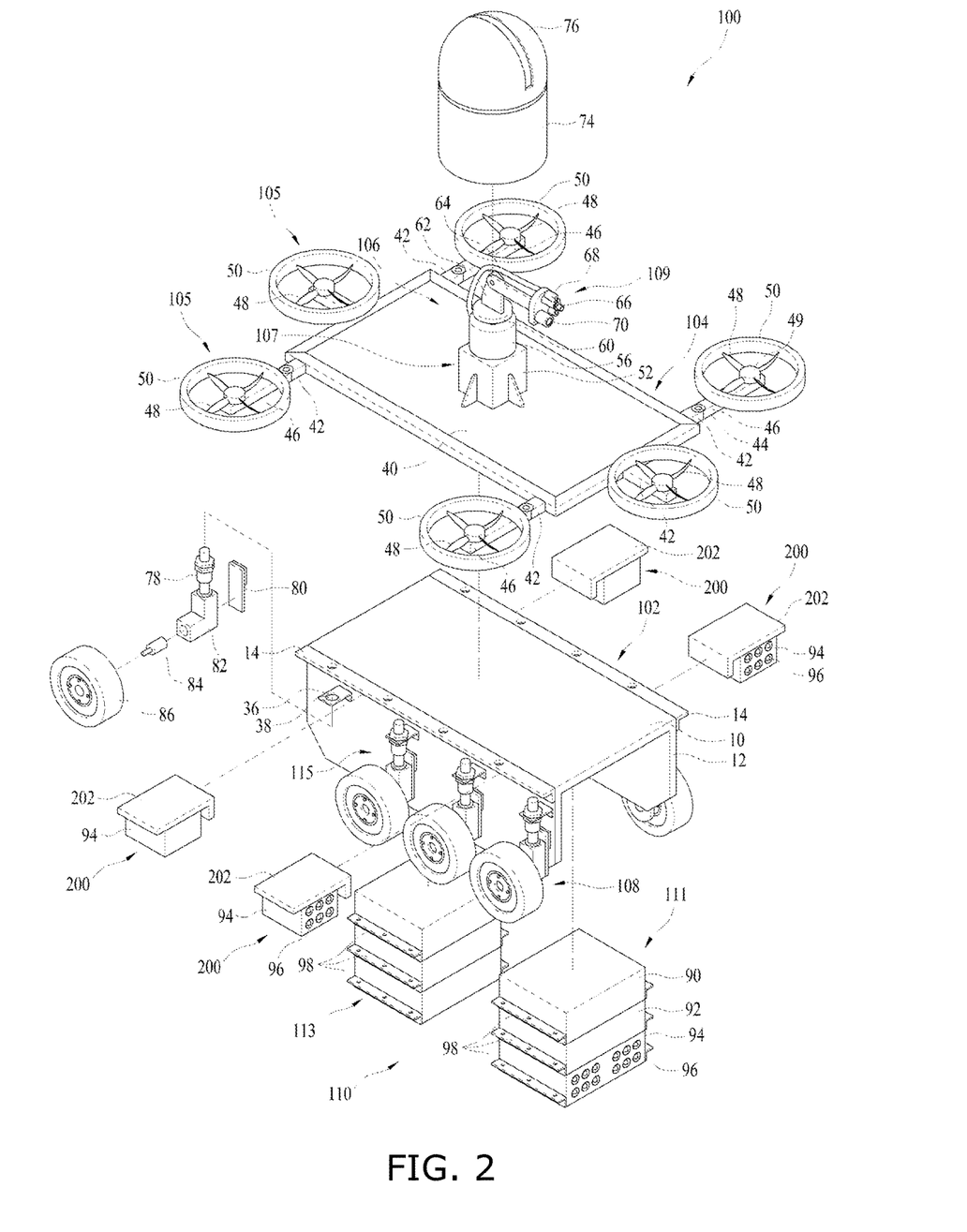
FIG. 2 is an exploded perspective view showing the structure of the fire extinguishing firefighting drone according to the present invention.
Figure 3:
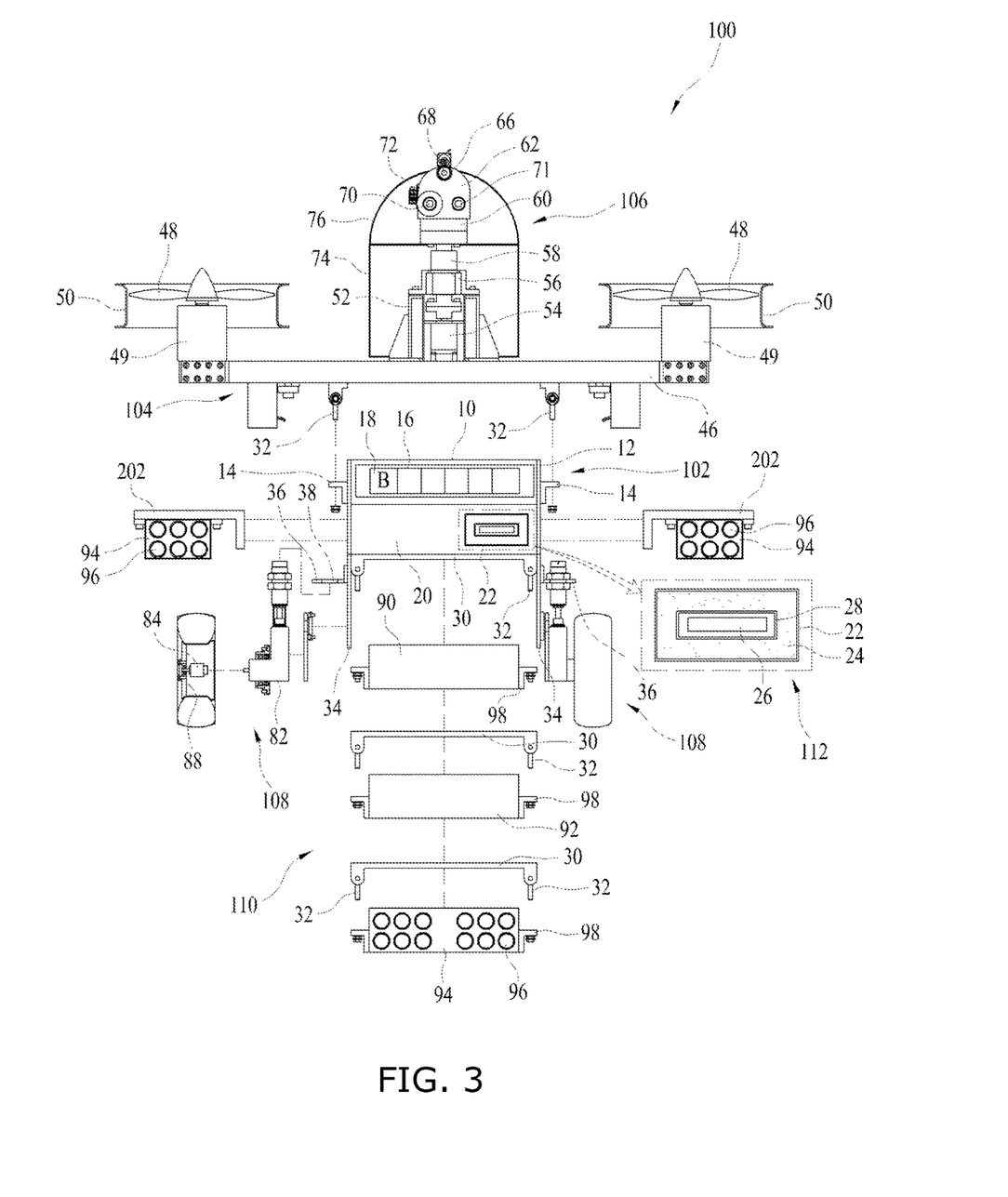
FIG. 3 is an assembly exploded perspective view showing the structure of the fire extinguishing firefighting drone according to the present invention.
Figure 4:
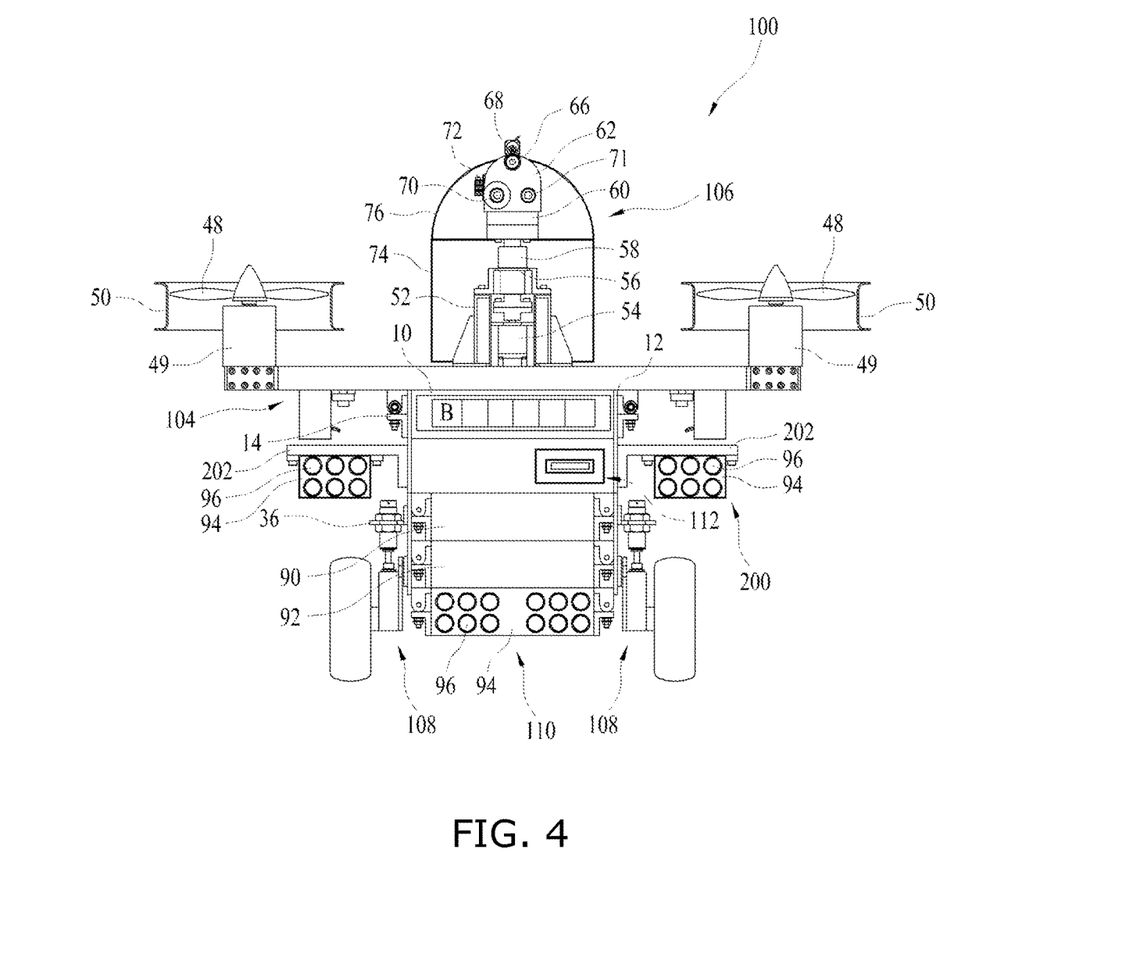
FIG. 4 is a front view showing the structure of the fire extinguishing firefighting drone according to the present invention.
Figure 5:
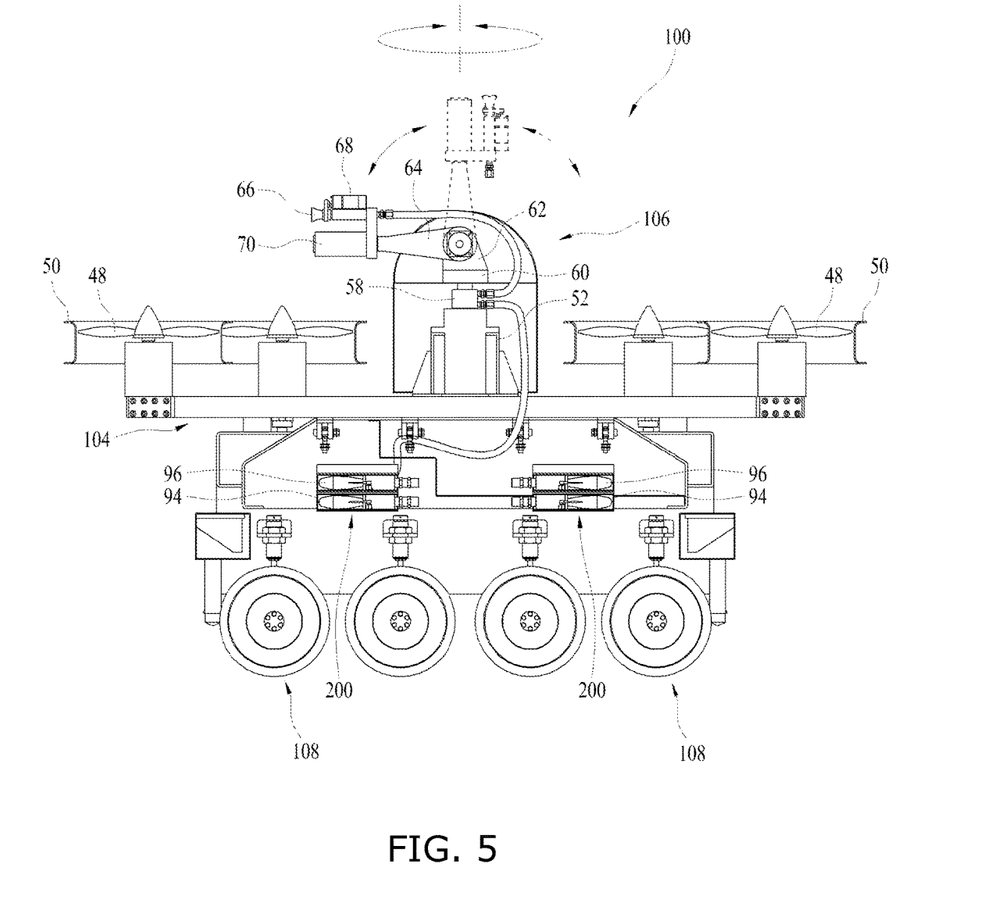
FIG. 5 is a side view showing the structure of the fire extinguishing firefighting drone according to the present invention.
Figure 6:
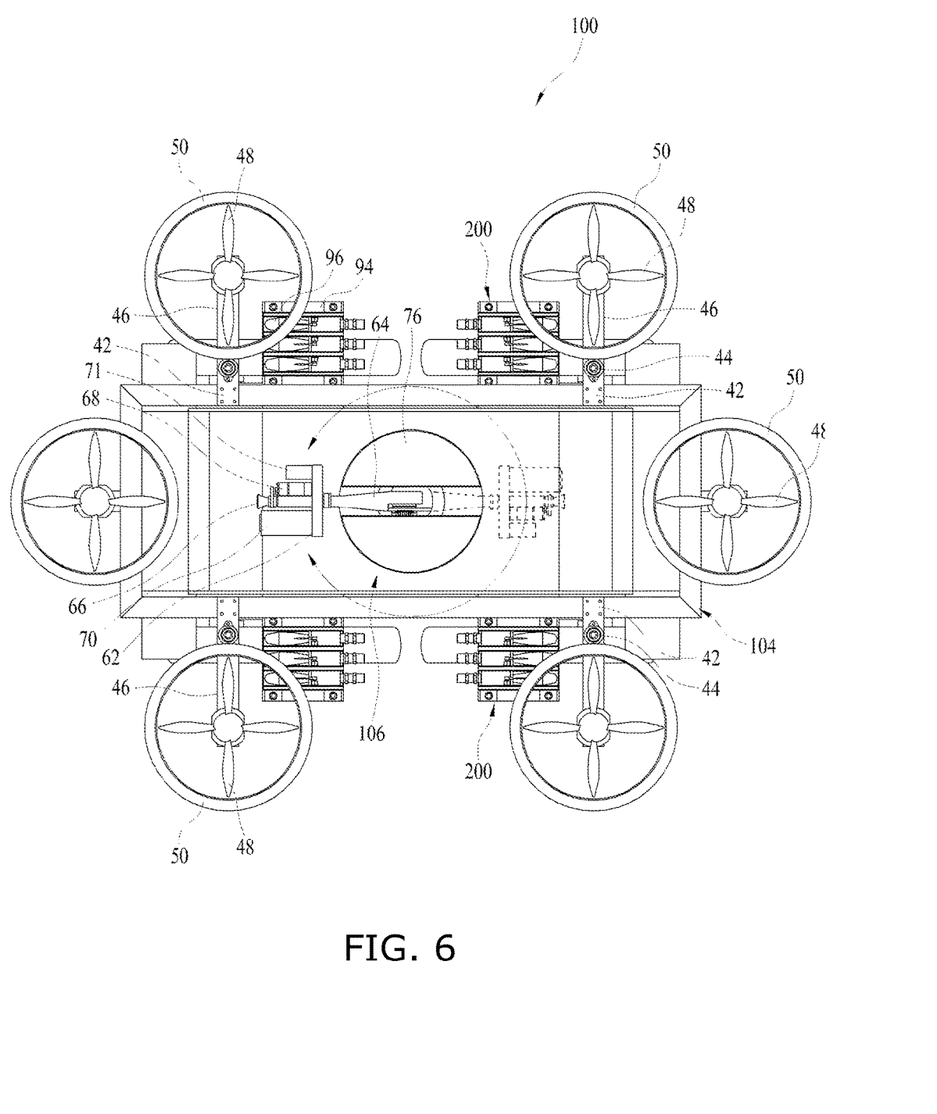
FIG. 6 is a plan view showing the structure of the fire extinguishing firefighting drone according to the present invention.
Figure 7:
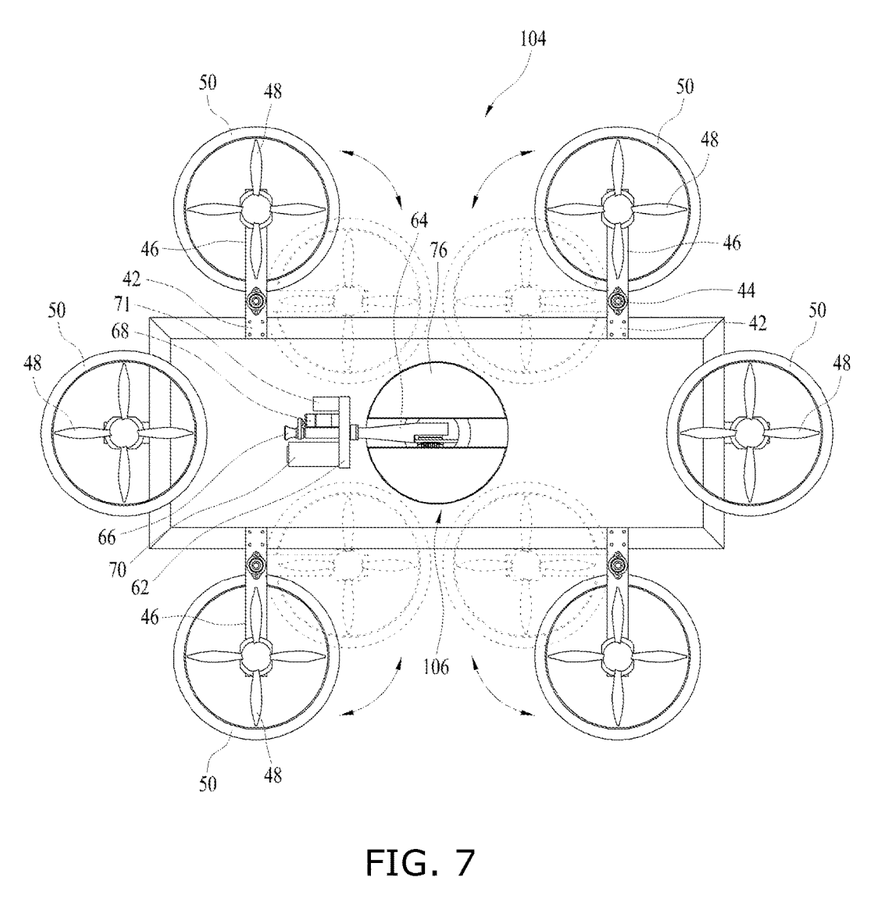
FIG. 7 is a view showing the operation state of the flight unit of the fire extinguishing firefighting drone according to the present invention.
Figure 8:
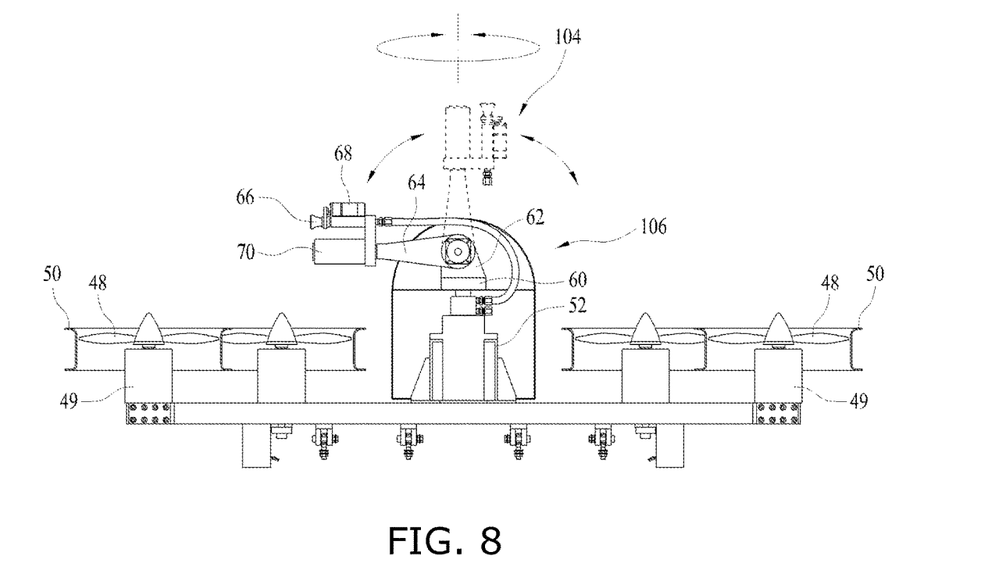
FIG. 8 is a side view showing the structure of the flight unit of the fire extinguishing firefighting drone according to the present invention.
Figure 9:
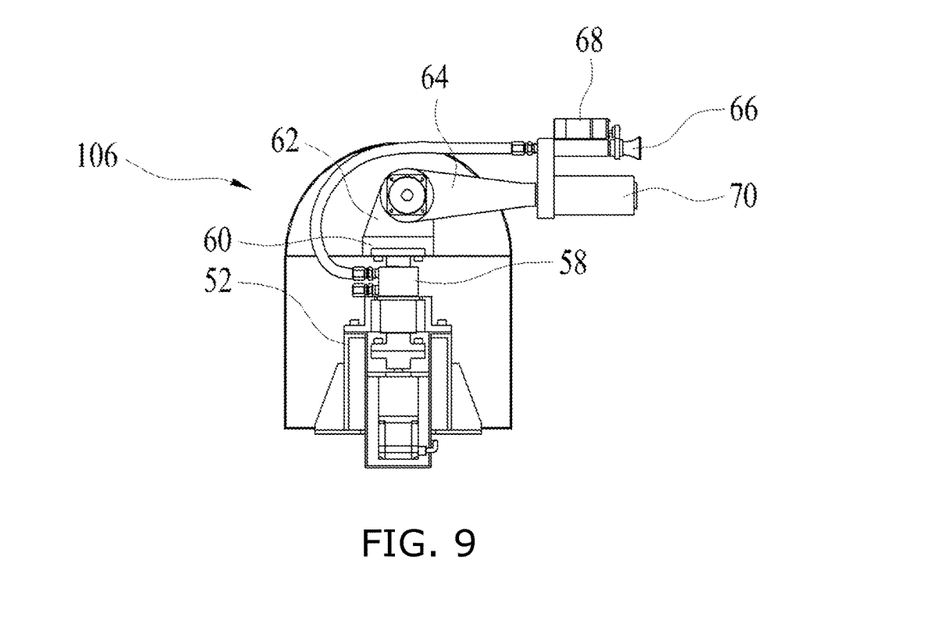
FIG. 9 is a side sectional view showing the structure of the disaster prevention turret unit of the fire extinguishing firefighting drone according to the present invention.
Figure 10:
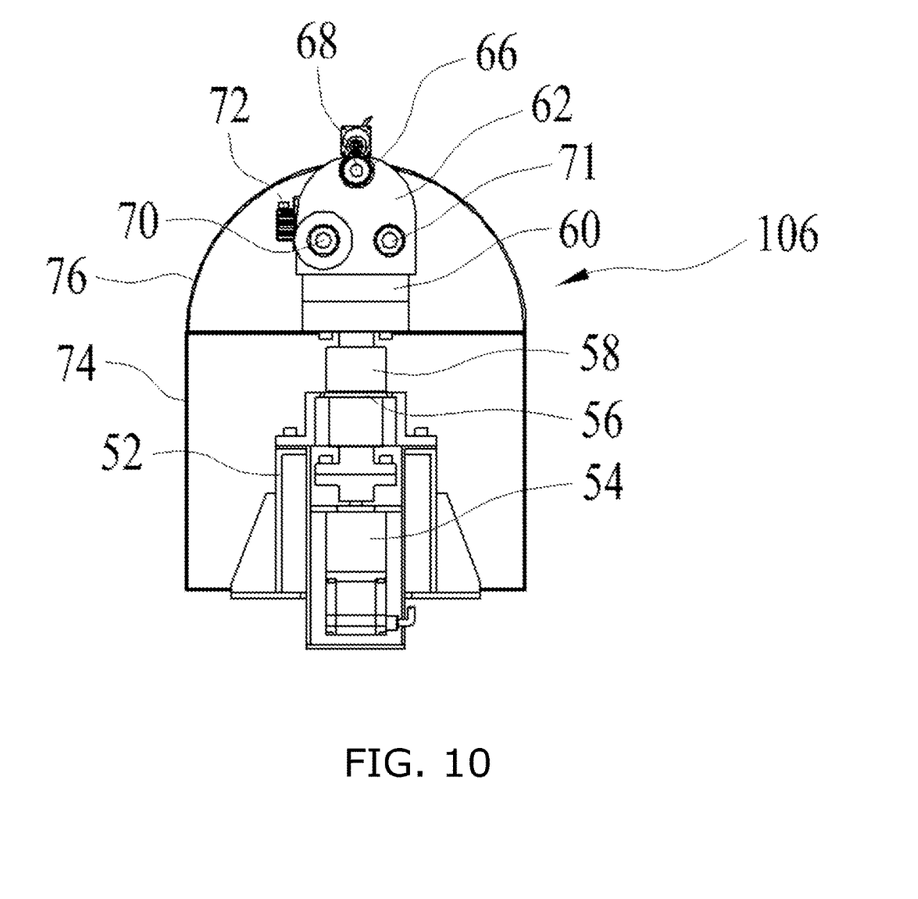
FIG. 10 is a front sectional view of FIG. 9.
Figure 11:
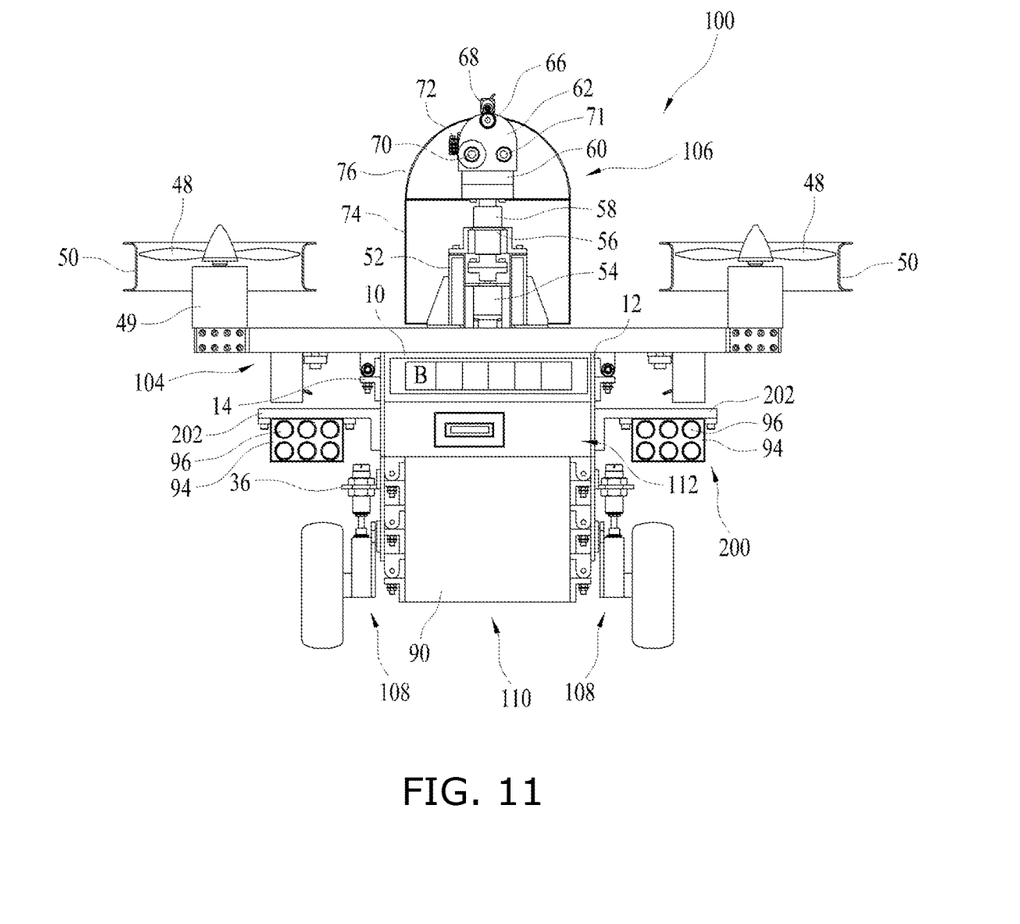
FIG. 11 is a view showing a state in which a lifesaving accommodation container has been installed in a fire extinguishing firefighting drone according to another embodiment of the present invention.
Figure 12:
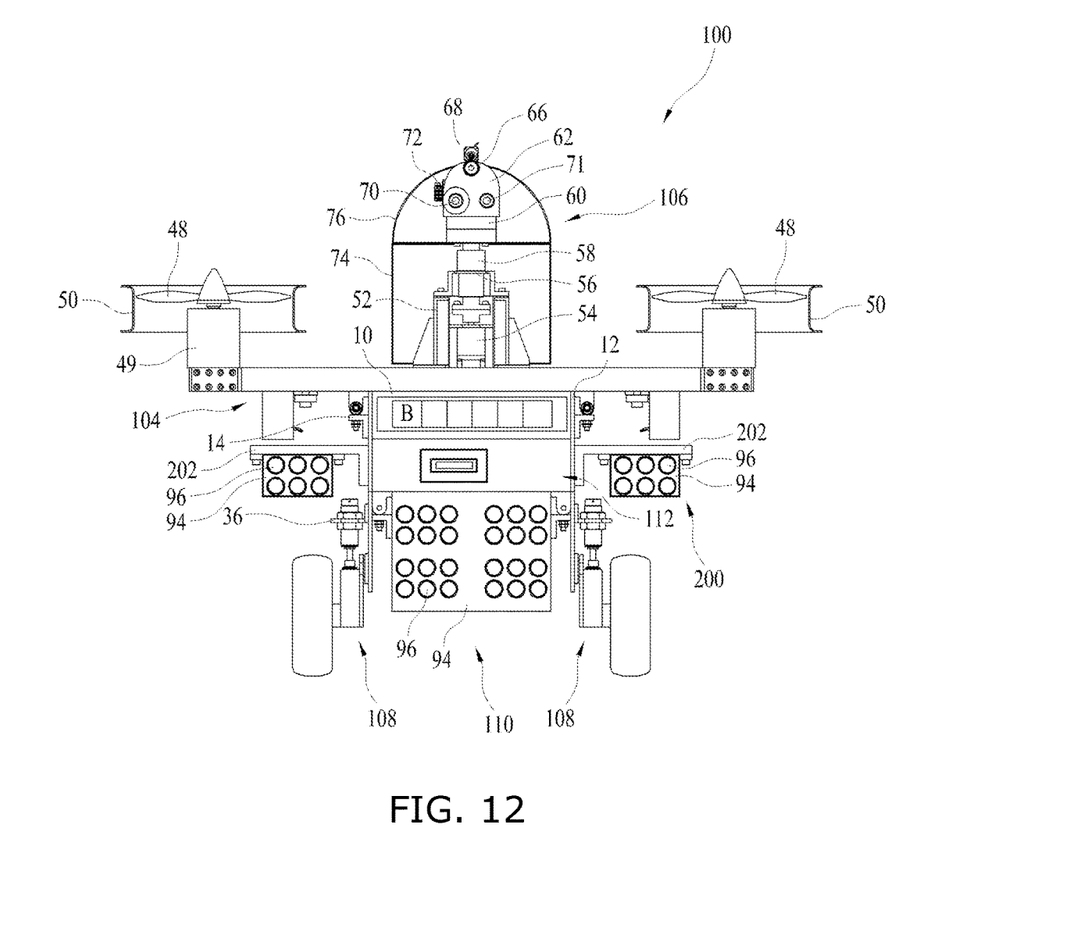
FIG. 12 is a view showing a state in which a disaster prevention fire-extinguishing bomb unit has been installed according to another embodiment of the present invention.
Figure 13:
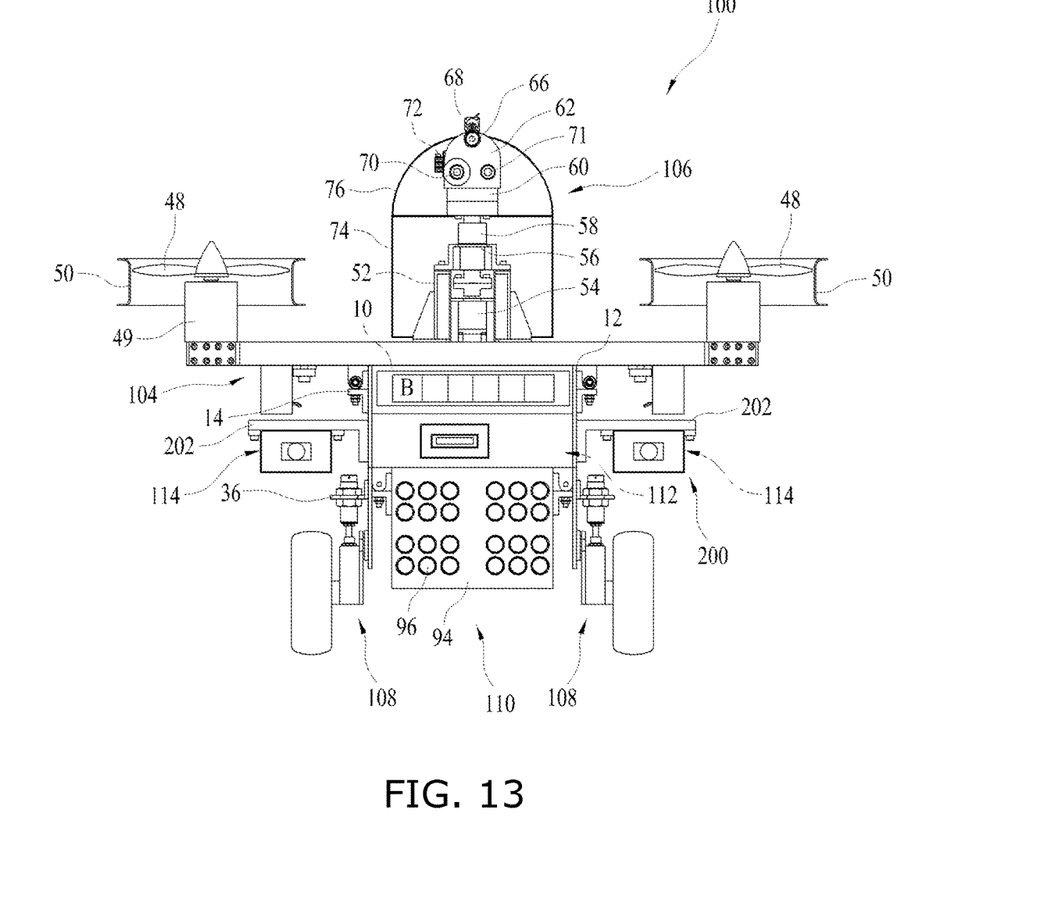
FIG. 13 is a view showing a state in which a high frequency vibration device has been installed according to another embodiment of the present invention.
Figure 14:
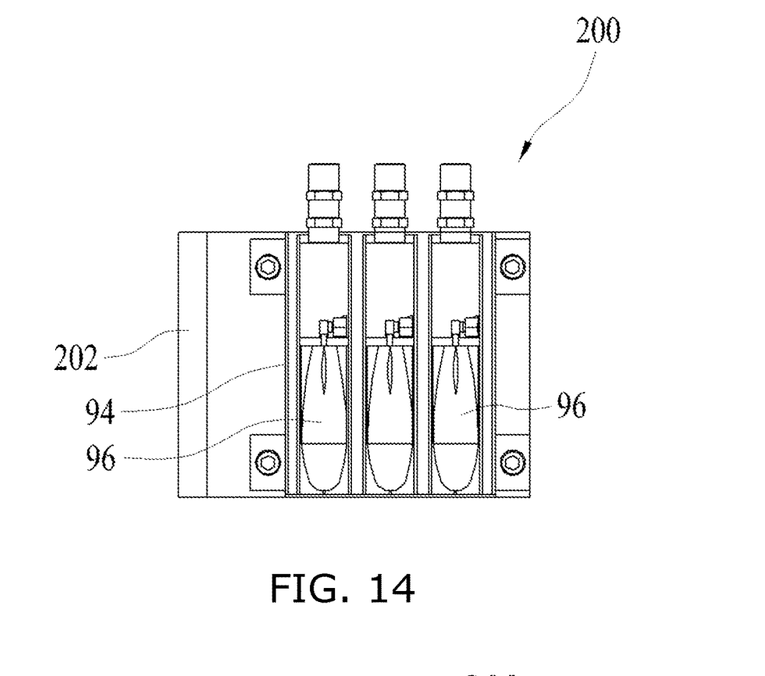
FIG. 14 is a plan view showing the structure of an auxiliary disaster prevention means according to the present invention.
Figure 15:
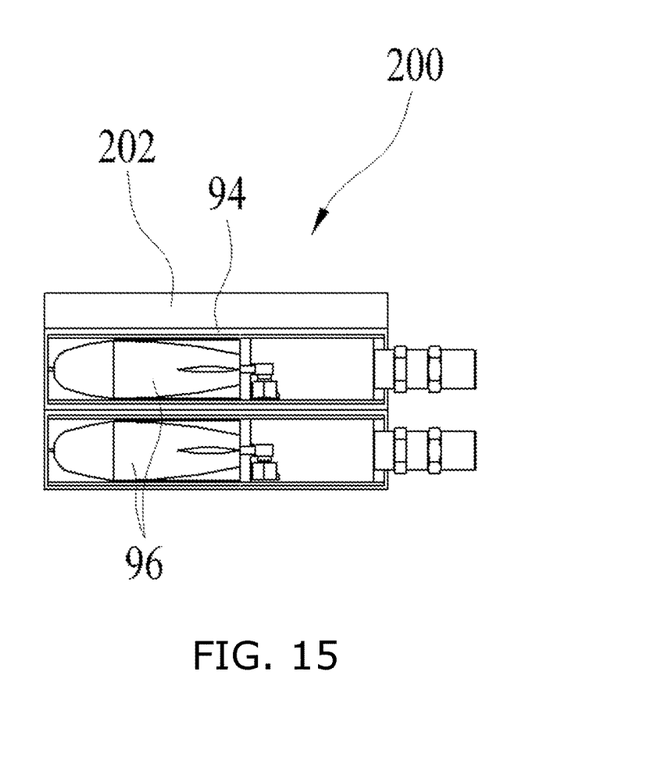
FIG. 15 is a side sectional view showing the structure of the auxiliary disaster prevention means according to the present invention.
Figure 16:
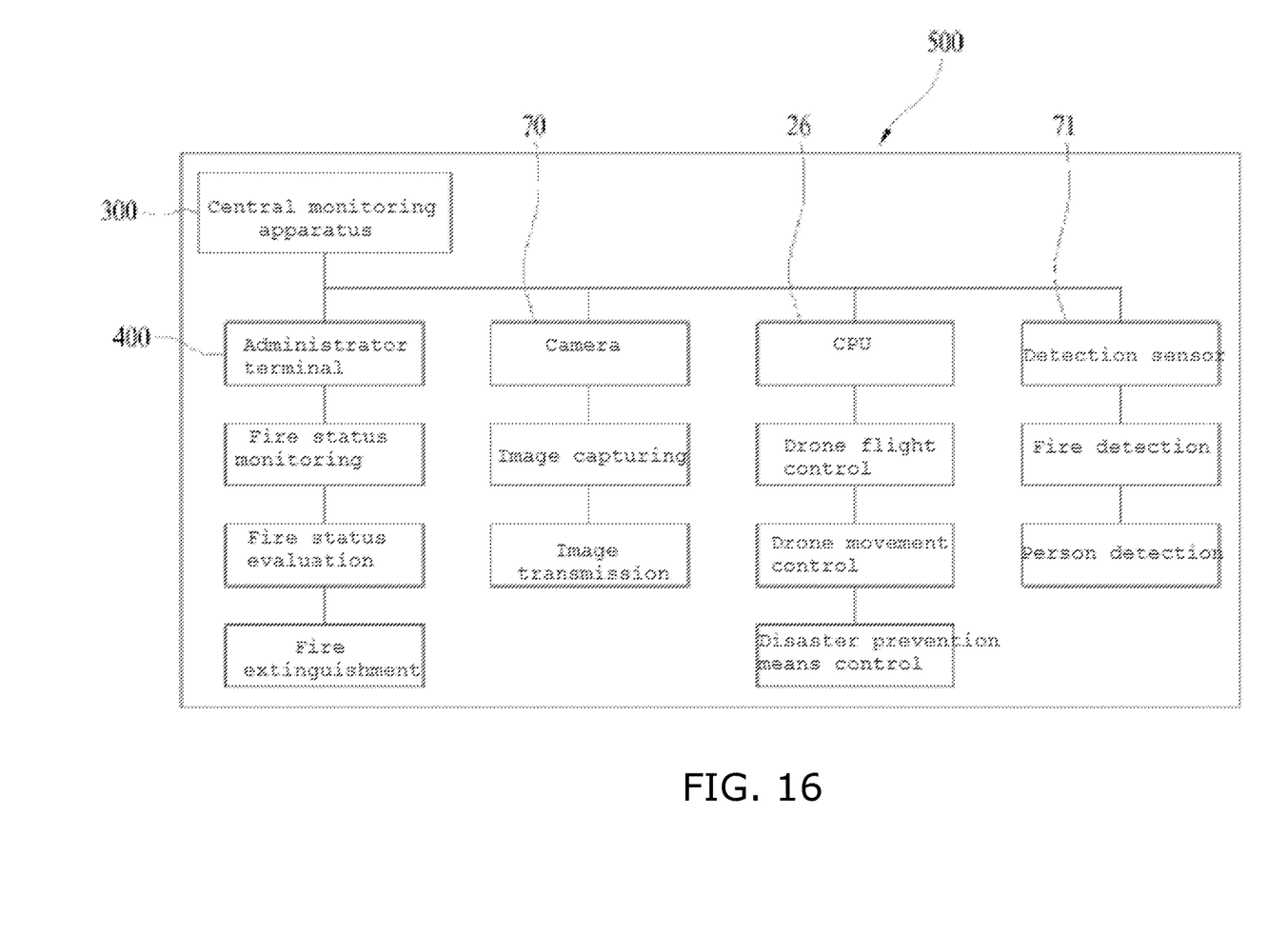
FIG. 16 is a block diagram showing the central control system of a fire extinguishing firefighting drone according to the present invention block.

An administrator terminal 400 may be provided with a real-time detection application, may be connected to a central monitoring apparatus 300 over a wired/wireless communication network through the execution of the real-time detection application, may receive the information of a fire image signal from the central monitoring apparatus 300, and may transmit a control command signal to the central monitoring apparatus 300.

Furthermore, the administrator terminal 400 enables an administrator to evaluate a fire image received from the central monitoring apparatus 300 and to take appropriate measures to extinguish a fire in connection with whether to save lives, whether to spray a fire-extinguishing chemical, or whether to launch a fire-extinguishing bomb.

In this case, the administrator terminal 400 is an output device capable of image and voice output. For example, a portable terminal including a communication function, such as smartphone, a PDA, a tablet PC, or the like, may be used as the administrator terminal 400.

The above description is intended merely to illustrate the technical spirit of the present invention. It will be apparent to those having ordinary knowledge in the art to which the present invention pertains that various modifications, alterations, and substitutions are possible without departing from the essential features of the present invention. Accordingly, the embodiments disclosed herein and the accompanying drawings are not intended to limit the technical spirit of the present invention, but are intended to illustrate the technical spirit of the present invention. The scope of the technical spirit of the present invention is not limited by these embodiments and the accompanying drawings. The range of protection of the present invention should be defined based on the attached claims, and all technical spirits falling within a range equivalent to the claims should be construed as being included in the range of rights of the present invention.

DESCRIPTION OF REFERENCE SYMBOLS

10: upper body 12: side body
14: bracket 16: battery accommodation part
18: battery 20: CPU accommodation part
22: CPU body 24: vacuum chamber
26: CPU 28: inner body
30: lower body 32: fasteners
34: side body 36: wheel bracket
38: fastening hole 40: flight unit body
42: propeller fastening base 44: hinge
46: foldable bar 48: guard
50: guard 52: fixed body
54: rotation motor 56: bearing housing
58: rotating shaft 60: rotating unit
62: fixed base 64: nozzle boom
66: nozzle 68: aperture-adjusting motor
70: camera 72: adjusting motor
74: lower cover 76: upper cover
78: shock absorber 80: hinge bracket
82: swing shaft 84: servo-motor
86: wheel 88: motor installation and fastening part
90: lifesaving structure accommodation container 92: fire-extinguishing chemical tank
94: fire-extinguishing bomb body 96: fire-extinguishing bomb
98: fastening bracket
100: fire extinguishing drone 102: body unit
104: flight unit 106: disaster prevention turret unit
108: movement unit 110: disaster prevention means unit
112: flight control unit 114: high-frequency vibration device
200: auxiliary disaster prevention means 202: auxiliary bracket

The invention claimed is:

1. A fire extinguishing firefighting drone which is flown and controlled in an unmanned manner, the drone comprising:
   a body unit (102) configured to include an upper body (10) and side bodies (12);
   a flight unit (104) configured to be installed on the body unit (102), and to have propeller units (105) so as to enable flight;
   a disaster prevention turret unit (106) configured to be installed on the flight unit (104), and to detect status of a fire and spray a fire-extinguishing chemical;
   a plurality of movement units (108) configured to be installed beneath the body unit (102), and to move the body unit (102); and
   a disaster prevention unit (110) configured to be provided with items adapted to spray a fire-extinguishing chemical, to launch a fire-extinguishing bomb, or to save lives depending on the status of the fire;
   wherein the body unit (102) includes:
   a battery accommodation part (16) configured to supply power to a lower portion of the upper body (10); and
   a lower body (30) configured such that a CPU accommodation part (20) is formed beneath the battery accommodation part (16), brackets (14) are installed on both sides of the side body (12), and fasteners (32) are provided beneath the CPU accommodation part (20); and a flight control unit (112) is included in the CPU accommodation part (20).

* * * * *